March 30, 1965 D. DANIELSEN 3,176,156

BIPOLAR CURRENT GENERATOR

Filed Dec. 21, 1961

INVENTOR
D. DANIELSEN
BY Lucian C. Canepa
ATTORNEY

3,176,156
BIPOLAR CURRENT GENERATOR

Daniel Danielsen, Bloomingdale, N.J., assignor to Bell Telephone Laboratories, Incorporated, New York, N.Y., a corporation of New York Filed Dec. 21, 1961, Ser. No. 161,152
12 Claims. (Cl. 307—88.5)

Figure 1:
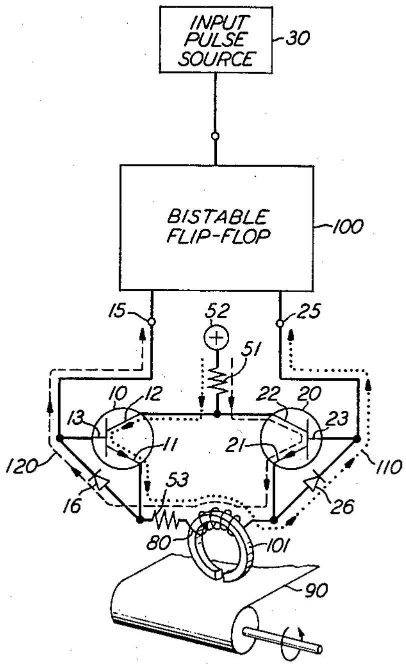

This invention relates to magnetic recording and more particularly to a circuit for recording binary information on magnetic tape.

Various methods for storing binary information on magnetic tape have been employed which rely on the hysteresis properties of a ferromagnetic tape to distinguish between stored binary "1" and "0" conditions. The two storage conditions may be differentiated, for example, by magnetization in either of the two different hysteresis polarities, by the presence or absence of magnetization, or by having a change in the storage flux polarity represent one storage condition with no change corresponding to the other condition.

Each of these recording methods requires a current source which is capable of supplying a distinctive type of current waveform to induce magnetic storage in localized segments of the storage tape in response to the information to be recorded. The current generator required for the first and third above-mentioned recording methods must supply a bipolar current of sufficient magnitude to saturate the recording tape in both hysteresis remanent polarities.

Various bipolar current-generating circuit arrangements are well known in the art. Bridge circuits have been employed with a magnetic writing head and a direct-current source as the alternate shunt elements of the bridge, such that a writing current of either polarity will flow through the writing head responsive to an unbalancing of the bridge. Other bipolar current generators have utilized a plurality of direct-current sources of differing polarities with switching arrangements to choose between the sources.

It is an object of the present invention to provide an improved magnetic recording arrangement.

More specifically, it is an object of the present invention to supply an improved writing circuit arrangement which generates a bipolar recording current.

Another object of the present invention is the provision of a magnetic recording write circuit which changes the polarity of the recording current in response to successive input pulses.

A further object of the present invention is the provision of a magnetic recording arrangement which is simply constructed, flexible in application, and highly reliable.

These and other objects of the present invention are realized in a specific illustrative embodiment thereof which comprises two transistors of the same type, each having its base connected to a different output terminal of a bistable flip-flop circuit which is, in turn, controlled by an input pulse source. The collectors of the transistors are electrically joined and further connected to a voltage source. The base-emitter junctions of both transistors are each shunted by a diode in an opposite polarity as the equivalent junction diode. A recording winding which is inductively coupled to a writing head is connected between the emitters of the two transistors.

For each stable condition of the flip-flop a conduction path is completed which includes the recording winding and the transistor whose base is connected to the high voltage flip-flop output terminal. As the flip-flop changes stable states responsive to successive input pulses from the input pulse source, the transistors alternately conduct, resulting in a recording current of an alternating polarity through the recording winding.

It is thus a feature of the present invention that a magnetic recording write circuit include a voltage source of only one polarity and not include a bridge arrangement.

It is another feature of the present invention that a magnetic recording write circuit include two transistors with the base of each transistor connected to a different output terminal of a bistable flip-flop circuit.

It is a further feature of the present invention that a magnetic recording write circuit include two transistors with their collectors electrically connected, a recording winding connected between the two emitters, the base of each transistor connected to a different output terminal of a flip-flop circuit, and a diode connected in shunt with each base-emitter junction.

Figure 2:
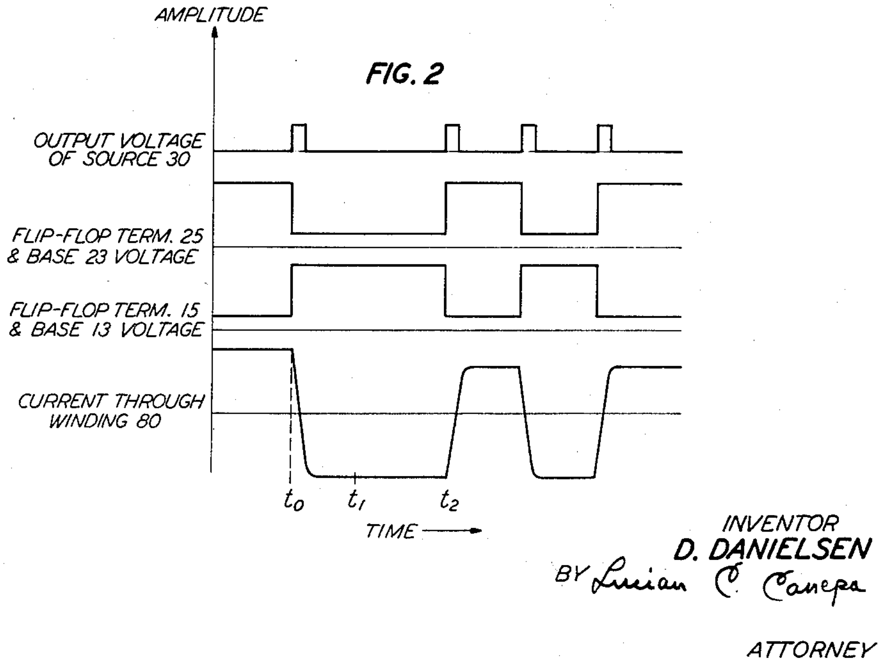

A complete understanding of the present invention and of the above and other features and advantages thereof may be gained from a consideration of the following detailed description of an illustrative embodiment thereof presented hereinbelow in connection with the accompanying drawing, in which:

FIG. 1 is a schematic diagram showing a specific illustrative magnetic recording write circuit which embodies the principles of the present invention, and FIG. 2 depicts waveforms characteristic of the circuit illustrated in FIG. 1.

Referring now to FIG. 1, there is shown a specific, illustrative, magnetic recording write circuit embodying the principles of the present invention, which is capable of supplying a bipolar recording current necessary for the non return to zero type of tape recording.

In the non return to zero, or NRZ method of tape recording, a change in the hysteresis orientation from one remanent polarity to the other corresponds to a stored binary "1," while a continuous magnetization corresponds to a stored binary "0."

Two transistors 10 and 20, illustrated in FIG. 1, are NPN devices having their collectors 12 and 22 electrically joined and further connected to a voltage source 52 by a resistor 51. The bases 13 and 23 of the transistors are returned to terminals 15 and 25, respectively, of a bistable flip-flop 100 which, in turn, is controlled by an input pulse source 30. The base-emitter junctions of the transistors 10 and 20 are shunted by diodes 16 and 26, respectively, each of which is connected in an opposite polarity as the equivalent base-emitter junction diode. A recording winding 80 and a resistor 53 are connected between the emitters 11 and 21 of the transistors. The winding 80 is inductively coupled to an open toroidal core recording head 101 which, in turn, is coupled to a driven magnetic tape 90.

To illustrate the operation of the above-described circuit arrangement, assume that the terminal 25 of the flip-flop 100 is in the relatively high potential state with terminal 15 in a relatively low potential state. These voltages are illustrated in FIG. 2 for times preceding $t_0$ and for the appropriate circuit terminals. In response to the aforementioned flip-flop condition, a conduction path, illustrated in FIG. 1 by the dashed line 120, is completed. The transistor 20 conducts because of the relatively high voltage connected to its base 23. A recording current emanates from source 52 and flows through the resistor 51, the collector 22 and emitter 21 of transistor 20, the recording winding 80 and the resistor 53, through the diode 16 which parallels the base-emitter junction of transistor 10, and is returned to ground through the relatively low voltage terminal 15 of flip-flop 100. The recording winding 80, when energized by this recording current following the path 120, generates a magnetic field which appears across a gap in the recording head core 101 and saturates the magnetic tape 90 in which the gap is inductively coupled.

The recording current, which is illustrated in FIG. 2, and also the recording flux will retain this magnitude and polarity until flip-flop 100 changes state responsive to a pulse from the pulse source 30, indicating a binary "1" is to be stored.

At the time $t_0$ shown in FIG. 2, an input pulse from the source 30 is transmitted to the flip-flop 100 which reverses its stable operating states, resulting in a reversal of conduction polarity through the output winding 80. Specifically, the base 13 of transistor 10 is now connected to the relatively high potential terminal 15 while the base 23 of resistor 20 is returned to the relatively low potential output terminal 25 of flip-flop 100, thereby causing the transistor 10 to conduct. The transistor 20 is cut off as its base-emitter junction is reverse-biased by the voltage drop across the diode 26. A conducting circuit path designated by the dotted line 110 is completed, and a recording current supplied by the source 52 flows through the resistor 51, into the collector 12 and out of the emitter 11 of the transistor 10 which is conducting, through the resistor 53, the winding 80 and the shunt diode 26, returning to ground through the relatively low potential output terminal 25.

The recording current having thus changed direction in the recording winding 80, the flux appearing across the gap in the recording head 101 also changes polarity resulting in a change in the magnetization polarity of the tape 90, thereby corresponding to a stored binary "1."

Note that at any time $t_1$ between the $t_0$ and $t_2$ pulses, the recording current through the recording winding 80 is constant in magnitude and polarity thereby creating no change in the magnetization condition of the tape 90, hence storing a binary "0."

The magnitude of the current that flows through the recording winding 80 is determined principally by the resistor 53. Under steady state conditions, the current which will flow through the winding 80 is essentially the difference in potential between the flip-flop outputs 15 and 25 divided by the resistance of the resistor 53. The resistor 51 is not necessary for proper circuit operation, but it does perform the desirable function of decreasing the power dissipated in the conducting transistor by lowering the collector-emitter voltage.

Note that the resistor 53 may be eliminated by inserting a resistor in series with each of the bases 13 and 23 of the transistors 10 and 20. The recording current of such an arrangement would be the difference in potential between the flip-flop output terminals 15 and 25 divided by the inserted base resistance multiplied by the base-to-emitter current gain of the conducting transistor.

In connection with the bottom-most waveform depicted in FIG. 2, it is noted that the transient waveform of the current through winding 80 between stable conduction conditions is dependent upon the nature of the impedance of the load inserted between the emitters 11 and 21 of the transistors 10 and 11. For the circuit arrangement illustrated in FIG. 1, where the load includes only the resistor 53 and the recording winding 80 which is representable as an inductance, the transient current undergoes an exponential change. This is the well-known result for a rectangular step voltage impressed upon a resistance and series-connected inductance. Because the transient time is small compared to the steady state conduction period, the current transient is depicted in FIG. 2 of the drawing as an almost linear change.

It should be noted that other impedance configurations may replace the winding 80. If a parallel inductance-capacitance arrangement is employed, an oscillatory transient will result, and further, a resistance may be added to this arrangement to critically damp the oscillations, thereby obtaining the maximum non-oscillatory switching speed. Also, a relatively large resistance may be added to swamp or mask any undesired parasitic effects where the nature of the load is indeterminate or subject to variations.

It is to be understood that the above-described arrangements are only illustrative of the application of the principles of the present invention. Numerous other arrangements may be devised by those skilled in the art without departing from the spirit and scope of the invention. For example, it should be noted that the principles of the present invention are not limited to the magnetic recording art. The inductive recording winding 80 may be replaced by a twistor of the type described in an application by A. H. Bobeck, Serial No. 675,522, filed August 1, 1957, now Patent 3,083,353, issued March 26, 1963, or any other current-operated device.

What is claimed is:

1. In combination in a magnetic recording write circuit, a first transistor including base means, collector means, emitter means and a base-emitter junction, a second transistor including base means, collector means, emitter means and a base-emitter junction, said first and second collector means being electrically connected together, a flip-flop having two output terminals, said first base means being connected to one of said output terminals and said second base means being connected to the other of said output terminals, a diode connected across the base-emitter junction of each of said transistors in an opposite polarity as the equivalent base-emitter junction diode, and a load connected between said first and second emitter means.

2. A combination as in claim 1 further comprising a pulse source, wherein said flip-flop is responsive to each pulse supplied by said pulse source for changing stable states.

3. A combination as in claim 2 further comprising a voltage source and a resistor, said resistor being serially connected to said voltage source and said first and second collector means.

4. A combination as in claim 3 wherein said load comprises a recording winding and a resistor connected in series therewith.

5. A bipolar current generator comprising a bistable flip-flop which includes first and second output terminals and means for selectively supplying relatively high and relatively low monopolar potentials to said first and second output terminals, means for changing the stable state of said flip-flop, first and second gated conducting means, first and second terminals included in each of said conducting means, means for establishing a conducting path between said first and second terminals of said first conducting means in response to said first flip-flop output terminal being in a relatively high potential state and for establishing a conducting path between said first and second terminals of said second conducting means in response to said second flip-flop output terminal being in a relatively high potential state, monopolar direct-current source means connected to said first terminals of said first and second conducting means, load means connected between said second terminals of said first and second conducting means, first diode means connected between said second terminal of said first conducting means and said first flip-flop output terminal, and second diode means connected between said second terminal of said second conducting means and said second flip-flop output terminal.

6. A bipolar current generator comprising a bistable flip-flop which includes first and second output terminals, means for changing the stable state of said flip-flop, first and second gated conducting means, first and second terminals included in each of said conducting means, means for establishing a conducting path between said first and second terminals of said first conducting means in response to said first flip-flop output terminal being in a relatively high potential state and for establishing a conducting path between said first and second terminals of said second conducting means in response to said second flip-flop output terminal being in a relatively high potential state, source means connected to said first terminals of said first and second conducting means, load means connected between said second terminals of said first and second conducting means, first diode means connected between said second terminal of said first conducting means and said first flip-flop output terminal, and second diode means connected between said second terminal of said second conducting means and said second flip-flop output terminal, said first and second conducting means respectively comprising first and second transistors, each including a collector and an emitter, said first terminal being the collector and said second terminal being the emitter of each of said transistors.

7. A combination as in claim 6 wherein said first and second transistors each further include a base, said base of said first transistor being connected to said first flip-flop output terminal and said base of said second transistor being connected to said second flip-flop output terminal.

8. A combination as in claim 7 wherein said means for changing said flip-flop states comprises a pulse source.

9. In combination in a bipolar current generator, first and second transistors each including base, emitter and collector means, said first and second collector means being electrically connected together, a load connected between said first and second emitter means, means for supplying a relatively high potential to one of said base means and a relatively low potential to the other of said base means, means for alternating said relatively high and said relatively low potentials, first diode means directly connected between said first base means and said first emitter means, and second diode means directly connected between said second base means and said second emitter means.

10. A combination as in claim 9 wherein said means for supplying said relatively high and said relatively low potentials comprises a bistable flip-flop arrangement.

11. A combination as in claim 10 wherein said means for alternating said relatively high and said relatively low potentials comprises a source of input pulses, wherein said bistable flip-flop is responsive to a pulse supplied by said pulse source for changing its stable conducting state.

12. A combination as in claim 11 further comprising a voltage source and a resistor, said resistor being serially connected to said voltage source and said first and second collector means.

References Cited by the Examiner

UNITED STATES PATENTS

| | | | |
|---|---|---|---|
| 2,356,589 | 8/44 | Hessenberg | 328—81 X |
| 2,825,821 | 3/58 | Logue | 307—88.5 |
| 2,892,953 | 6/59 | McVey | 307—88.5 |
| 2,920,216 | 1/60 | Brauer | 307—88.5 |
| 2,956,272 | 11/60 | Cohler et al. | 307—88.5 |

FOREIGN PATENTS

| | | |
|---|---|---|
| 226,929 | 5/58 | Australia. |

ARTHUR GAUSS, *Primary Examiner.*